(12) United States Patent
Gu et al.

(10) Patent No.: US 10,427,107 B2
(45) Date of Patent: Oct. 1, 2019

(54) HIGH-STRENGTH HOLLOW FIBER ZEOLITE MEMBRANE AND ITS PREPARATION METHOD

(71) Applicant: NANJING UNIVERSITY OF TECHNOLOGY, Nanjing (CN)

(72) Inventors: Xuehong Gu, Nanjing (CN); Dezhong Liu, Nanjing (CN); Zhenzhou Shi, Nanjing (CN); Chun Zhang, Nanjing (CN); Xuerui Wang, Nanjing (CN)

(73) Assignee: NANJING TECH UNIVERSITY, Nanjing, JS (CN)

( * ) Notice: Subject to any disclaimer, the term of this patent is extended or adjusted under 35 U.S.C. 154(b) by 788 days.

(21) Appl. No.: 14/898,472

(22) PCT Filed: May 9, 2014

(86) PCT No.: PCT/CN2014/077166
§ 371 (c)(1),
(2) Date: Dec. 14, 2015

(87) PCT Pub. No.: WO2015/100900
PCT Pub. Date: Jul. 9, 2015

(65) Prior Publication Data
US 2016/0214064 A1  Jul. 28, 2016

(30) Foreign Application Priority Data
Dec. 31, 2013  (CN) .......................... 2013 1 0754315

(51) Int. Cl.
*B01D 71/02* (2006.01)
*B01D 69/08* (2006.01)
(Continued)

(52) U.S. Cl.
CPC ......... *B01D 71/028* (2013.01); *B01D 67/009* (2013.01); *B01D 67/0051* (2013.01);
(Continued)

(58) Field of Classification Search
None
See application file for complete search history.

(56) References Cited

U.S. PATENT DOCUMENTS 3,574,538 A * 4/1971 McDaniel et al. .......................... C01B 33/2838
423/709
4,340,573 A * 7/1982 Vaughan ................. C01B 39/02
423/709
(Continued)

FOREIGN PATENT DOCUMENTS

| CN | 101381087 A | * | 3/2009 | ......... B01D 67/0051 |
| CN | 102580568 A | * | 7/2012 | |
| GB | 1465842 A | * | 3/1977 | .............. B01J 29/08 |

OTHER PUBLICATIONS

Colin S. Cundy & Paul A. Cox, The Hydrothermal Synthesis of Zeolites: History and Development from the Earliest Days to the Present Time, 103 Chem. Rev. 663, 663-701 (2003). (Year: 2003).*

*Primary Examiner* — Krishnan S Menon
*Assistant Examiner* — Brad Gordon
(74) *Attorney, Agent, or Firm* — George G. Wang; Bei & Ocean

(57) ABSTRACT

The invention relates to a high-strength hollow fiber zeolite membrane and its preparation method, characterized in that the support of the high-strength zeolite membrane has a multi-channel hollow fiber configuration. The preparation method comprises first preparing a crystal seed solution, then immersing the dry support with the multi-channel hollow fiber configuration in the crystal seed solution, and extracting and drying the support to obtain a crystal-seeded support; and finally placing the crystal-seeded support in a zeolite membrane synthetic fluid, performing hydrothermal synthesis, and taking out, washing and drying the product to obtain the high-strength hollow fiber zeolite membrane. The (Continued)

(a)

(b)

multi-channel hollow fiber support can provide high mechanical property, which greatly reduces the depreciation rate of the hollow fiber zeolite membrane equipment during use. Meanwhile, the multi-channel hollow fiber zeolite membrane prepared by the Invention possesses high loading density of permeation flux and membrane module and can reduce the production cost and improve the separation efficiency significantly, and thus lays the foundation for promoting the industrial application of the hollow fiber zeolite membrane.

5 Claims, 2 Drawing Sheets

(51) Int. Cl.
*B01D 67/00* (2006.01)
*B01D 69/10* (2006.01)
*B01D 69/02* (2006.01)
*B01D 61/36* (2006.01)

(52) U.S. Cl.
CPC ..... *B01D 67/0088* (2013.01); *B01D 67/0093* (2013.01); *B01D 67/0095* (2013.01); *B01D 69/02* (2013.01); *B01D 69/08* (2013.01); *B01D 69/105* (2013.01); *B01D 61/362* (2013.01); *B01D 2323/00* (2013.01); *B01D 2325/02* (2013.01); *B01D 2325/24* (2013.01)

(56) References Cited

U.S. PATENT DOCUMENTS

2001/0053741 A1* 12/2001 Micco ............... C01B 39/023
502/79
2003/0228969 A1* 12/2003 Dong ................. B01D 67/0051
502/4
2010/0304953 A1* 12/2010 Liu ..................... B01D 63/082
502/4

* cited by examiner (a)　　　　　　　　　(b)

(a)　　　　　　　　　(b)

(a)　　　　　　　　　(b)

(a)　　　　　　　　　(b)

HIGH-STRENGTH HOLLOW FIBER ZEOLITE MEMBRANE AND ITS PREPARATION METHOD

CROSS-REFERENCE TO RELATED APPLICATIONS

This application claims priority from CN Application No. 201310754315.0, filed Dec. 31, 2013 and PCT Application No. PCT/CN2014/077166, filed May 9, 2014, the contents of which are incorporated herein in the entirety by reference.

FIELD OF THE INVENTION

The present invention belongs to the field of inorganic membrane preparation, relating to a high-strength hollow fiber zeolite membrane and its preparation method.

BACKGROUND OF THE INVENTION

Membrane separation technology is a novel high-efficiency and energy-saving separation technology that is widely used in many fields of petrochemical industry, food, medicine, energy, electronic industry, environmental protection and so on. As one of the high and new technologies for realizing sustainable economic development of China, membrane separation technology shows the significant advantage in solving the major problems as resource shortage, energy shortage and environmental pollution, etc. With the constant development in the field of membrane technology application, the requirement for the membrane material becomes more rigorous and the application scope of the organic polymeric membrane with low cost is limited to some extent. Therefore, the research and development for high-performance membrane materials that possess favorable thermal and chemical stability and service condition adaptability has attracted much attention. Wherein, the inorganic membrane material with the advantages of high temperature resistance, great mechanical strength and high chemical resistance is applied more and more extensively in the field of membrane technology.

As an important part of inorganic membrane materials, in addition to some common features of inorganic membrane, zeolite membrane possess well-regulated and uniform pore structure, thus it possesses excellent catalysis property and separation selectivity and has a broad application prospect in membrane separation, membrane catalysis and ion exchange, etc. The pore diameter of the zeolite membrane is generally less than 1 nm. The effective separation between different molecules can be realized based on molecular sieving or difference in adsorption. More and more zeolite membranes have been applied in the pervaporation separation, such as NaA, MFI and T-types zeolite membrane, and the research on NaA zeolite membrane is conducted most extensively.

NaA zeolite membrane has a strong hydrophilicity and its pore size is 0.42 nm which is larger than the dynamic diameter of water molecule (0.29 nm) and smaller than most organic molecules. Therefore, the membrane material exhibits an extremely high water permeation selectivity in dehydrations of organic solutions. At present, pervaporation dehydration units using NaA zeolite membranes have been introduced to industrial application successfully. The adopted support of NaA zeolite membrane is mainly single-channel tube configuration with a low flux and limited loading density (30-250 $m^2/m^3$); nevertheless, its high equipment cost obstacles its further industrialization process.

Compared with the conventional tubal supports, the wall of the single-channel ceramic hollow fiber is thin, thus reducing trans-membrane resistance and increasing the permeation flux of NaA zeolite membrane greatly. Therefore, for higher packing density and separation efficiency of the membrane module and a low production cost, the single-channel ceramic hollow fiber support is introduced for the preparation of NaA zeolite membrane. Xu et al. (Xu et al. Journal of Membrane Science, 2004, 229(1): 81-85) prepared NaA zeolite membrane on single-channel ceramic hollow fiber support in 2004, however the dense NaA zeolite membrane only can be obtained through three times of synthesis; Wang et al. (CN200910098234.3) synthetized NaA zeolite membrane on the single-channel aluminum oxide hollow fiber support by adopting the crystal seed coating method of dip coating—roll coating, and the permeation flux of which was maintained between 5.0-9.0 $kg \cdot m^{-2} \cdot h^{-1}$; in addition, Wang et al. (CN201210051366.2) adopted the method of adding adhesive for crystal seed coating and synthetized NaA zeolite membrane on the inner surface of single-channel hollow fiber through dynamic hydrothermal synthesis, and the permeation flux of the membrane was between 5.9-6.9 $kg \cdot m^{-2} \cdot h^{-1}$.

Although the property of the single-channel hollow fiber zeolite membrane is improved to some extent compared with the conventional tube-type zeolite membrane, it is easy to be broken and damaged during the process of equipping and use due to poor mechanical property. Hollow fiber module is bundling packed. The breakage of the single fiber in the packing will cause liquid leakage for the whole module and thus to reduce overall separation property of the hollow fiber module. Through optimizing the hollow fiber configuration, we successfully prepared a multi-channel ceramic hollow fiber with high mechanical property and applied for a patent for invention (CN2013102440942). Developing the hollow fiber zeolite membrane combined with high mechanical property and high flux on multi-channel hollow fiber is the key to promote the industrialized application process of hollow fiber zeolite membrane.

SUMMARY OF THE INVENTION

The purposes of the Invention are to provide a high-strength hollow fiber zeolite membrane to remove the deficiency of the existing technology, and to provide a method for preparing the above hollow fiber zeolite membrane so as to solve the strength problem for the hollow fiber zeolite membrane during use, and enable the prepared zeolite membrane possess excellent permeability.

Technical scheme of the Invention: a high-strength hollow fiber zeolite membrane, characterized in that the support of the high-strength zeolite membrane has a multi-channel hollow fiber configuration.

The Invention also provides a method for preparing the above high-strength hollow fiber zeolite membrane, comprising the following steps:

(1) preparing crystal seed solution: preparing the zeolite crystal seed particle and water to a zeolite suspension liquid with the mass fraction of zeolite crystal seed of 0.5-5%, then adding sodium silicate in the zeolite suspension liquid to obtain a well-diversified crystal seed solution upon ultrasonic processing;

(2) crystal seed coating: immersing the dry support with multi-channel hollow fiber configuration in the crystal seed solution, and extracting and drying the support to obtain a crystal-seeded support;

(3) synthesis of membrane: placing the crystal-seeded support in a zeolite membrane synthetic fluid, performing hydrothermal synthesis, and taking out, washing the product to PH=7-9 and drying it to obtain the high-strength hollow fiber zeolite membrane.

Preferably, the average particle diameter of the zeolite crystal seed particle is 50 nm-3 µm; the amount of the sodium silicate added in the zeolite crystal seed suspension liquid is 0-25% of the mass fraction of the zeolite suspension liquid.

Preferably, the multi-channel hollow fiber configuration in step (2) has 3-9 channels; the external diameter of the support of the multi-channel hollow fiber configuration is 2.0-4.0 mm, the diameter of the channel 0.6-1.2 mm, the average pore diameter 0.6-1.5 µm and the porosity factor of the support 30-70%.

Preferably, the material of the said support of the high-strength zeolite membrane is one or more of aluminum oxide, titanium oxide, yttria-stabilized zirconia (YSZ) or silicon oxide.

The zeolite membrane prepared by the Invention can both be outer membrane or inner membrane.

Preferably, the said zeolite crystal seed particle is one of the zeolites of NaA, T-type, MFI-type or CHA-type.

Using high-strength multi-channel hollow fiber support and through the method of improving liquid viscosity of the crystal seed by adding sodium silicate into crystal seed solution to obtain a well-proportioned crystal seed layer, and then prepare the zeolite membrane through hydrothermal synthesis.

In the said step (3), the zeolite membrane synthetic fluid is prepared according to the conventional proportion in the references; generally, the mole ratio of NaA zeolite membrane synthetic fluid accords with $Al_2O_3:SiO_2:N_2O:H_2O=1:1-5:1-50:100:100-1000$; the mole ratio of T-type zeolite membrane synthetic fluid accords with $SiO_2:Al_2O_3:N_2O:K_2O:H_2O=1:0.01-0.08:0.1-0.5:0.02-0.3:10-28$; the mole ratio of MFI-type zeolite membrane synthetic fluid accords with tetrapropyl ammonium hydroxide:tetraethyl orthosilicate: 1:2-6:300-1500.

Beneficial Effects:

The multi-channel hollow fiber zeolite membrane and the preparation method therefore provided by the Invention possess the following advantages relative to the existing hollow fiber zeolite membrane:

(1) The substrate of the multi-channel hollow fiber zeolite membrane selected by the Invention has a multi-channel hollow fiber configuration, the high mechanical property of which lies in that the breakage load of the multi-channel hollow fiber is more than 3 times of that of single-channel hollow fiber under the same condition, thus effectively reducing the depreciation rate of the hollow fiber zeolite membrane equipment during use.

(2) The microstructure of the support of the multi-channel hollow fiber zeolite membrane selected by the Invention has strong control performance, which can meet different requirements for the related parameters as pore diameter and porosity factor in the process of application.

(3) The multi-channel hollow fiber zeolite membrane prepared by the Invention may be multi-channel hollow fiber outer molecular or multi-channel hollow fiber inner molecular, which can realize the effective control for membrane area within the element module.

(4) When used for separating 10 wt. % water/ethanol (75° C.), the permeation water flux of the multi-channel hollow fiber NaA zeolite membrane prepared by the Invention is as high as 12.8 $kg·m^{-2}·h^{-1}$, much higher than the tubular NaA zeolite membranes and the reported hollow fiber zeolite membrane.

(5) The synthetic method for the multi-channel hollow fiber zeolite membrane prepared by the Invention is simple and it only needs to add sodium silicate into crystal seed solution to improve the binding force of the crystal seed and the support body, and it is with good repeatability and easy to realize industrial scaling-up.

DETAILED DESCRIPTION OF PARTICULAR EMBODIMENTS OF THE INVENTION

Embodiment 1

Figure 1:
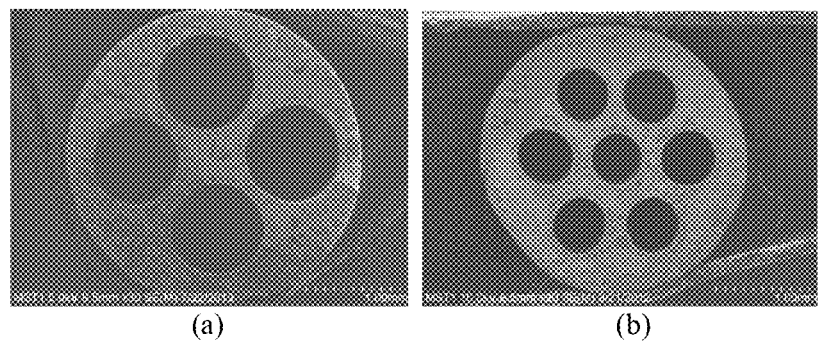
FIG. 1 is the support configuration of different multi-channel hollow fibers: wherein, (a) is four channels and (b) is seven channels.

Four-channel $Al_2O_3$ hollow fiber is selected as the support (as shown in FIG. 1 (a)), of which porosity factor is 54%, average pore diameter 0.9 µm, outer diameter 3.4 mm and channel diameter 0.9 mm. The breakage load of the four-channel hollow fiber with a span length of 4 cm is 17N in the three-point bending strength test of the support.

Figure 2:
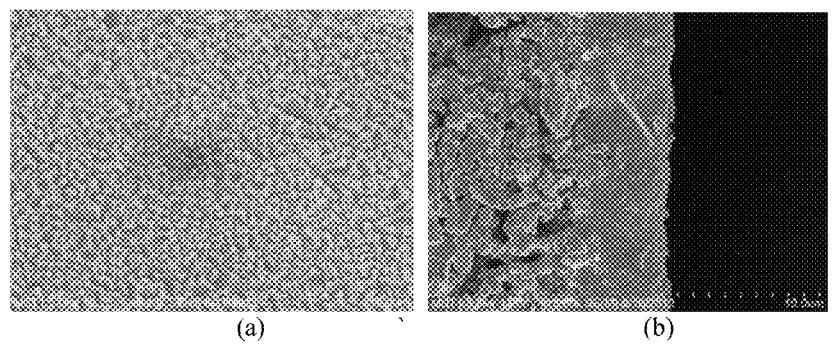
FIG. 2 is (a) surface microtopography and (b) fracture surface microtopography of four-channel hollow fiber NaA zeolite membrane in Embodiment 1.

Firstly, NaA zeolite crystal seed particles with an average particle diameter of 80 nm are fully dispersed in water to prepare the crystal seed suspension liquid with a mass fraction of 1%; then sodium silicate is added into the zeolite crystal seed suspension liquid, with an amount that is 5% of the mass fraction of the zeolite suspension liquid; then a dispersed crystal seed solution is obtained after full stirring. The dried support is immersed in the crystal seed solution to obtain an outer surface crystal-seeded four-channel hollow fiber support after extracting and drying (as shown in FIG. 2).

Figure 3:
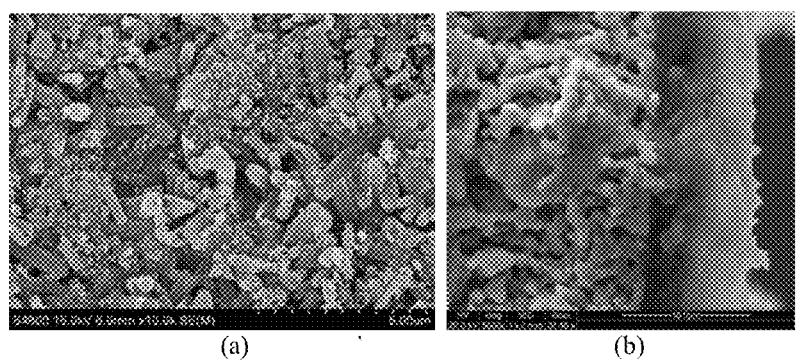
FIG. 3 is (a) surface microtopography and (b) fracture surface microtopography of seven-channel hollow fiber T-type zeolite membrane in Embodiment 5.

The synthetic fluid of NaA zeolite membrane is prepared according to the mole ratio as $Al_2O_3:SiO_2:Na_2O:H_2O=1:2:2:120$; the crystal-seeded multi-channel hollow fiber support is added into the prepared synthetic fluid and washed with deionized water to PH=8 after crystallizing and cooling, and finally dried for standby application. The photographs of surface and fracture surface of the prepared zeolite membrane are shown in FIG. 3.

Embodiment 2

Four-channel $Al_2O_3$ hollow fiber is selected as the support, of which the porosity factor is 50%, average pore diameter 1.2 µm, outer diameter 3.0 mm and channel diameter 0.8 mm. The breakage load of the four-channel hollow fiber with a span length of 4 cm is 19N in the three-point bending strength test.

Firstly, NaA zeolite crystal seed particles with an average particle diameter of 220 nm are fully dispersed in water to prepare a crystal seed suspension liquid with the mass fraction of 3%; then sodium silicate is added into the zeolite crystal seed suspension liquid, with an amount that is 10% of the mass fraction of the zeolite suspension liquid; then a dispersed crystal seed solution is obtained after full stirring. The dried support is immersed in the crystal seed solution to obtain an inner surface crystal-seeded four-channel hollow fiber support after extracting and drying.

A synthetic fluid is prepared according to the mole ratio as $Al_2O_3:SiO_2:Na_2O:H_2O=1:2:2:150$; the preparation of the synthetic fluid of four-channel hollow fiber NaA inner membrane is the same as that in Embodiment 1.

Embodiment 3

Four-channel $Al_2O_3$ hollow fiber is selected as the support (as shown in FIG. 1(b)), of which porosity factor is 45%, average pore size 0.9 µm, outer diameter 3.2 mm and channel diameter 0.8 mm. The breakage load of the four-channel hollow fiber with a span length of 4 cm is 21N in the three-point bending strength test.

Firstly, NaA zeolite crystal seed particle with an average particle diameter of 2 µm in water to prepare a crystal seed suspension liquid with a mass fraction of 5%; then sodium silicate is added into the zeolite crystal seed suspension liquid, with an amount that is 20% of the mass fraction of the zeolite suspension liquid; then a dispersed crystal seed solution is obtained after full stirring.

The crystal seed coating is the same as that in Embodiment 1; a synthetic fluid is prepared according to the mole ratio as $Al_2O_3:SiO_2:Na_2O:H_2O=1:2:2:120$; the synthesis of the NaA zeolite membrane is the same as that in Embodiment 1.

For measurement of the pervaporation property of the multi-channel NaA zeolite membrane prepared by the Invention, the pervaporation property of the membrane is evaluated with penetration water flux (J) and separation factor (α).

$$J = \frac{m}{A \cdot t} \quad (1)$$

$$\alpha = \frac{Y_2/Y_1}{X_2/X_1} \quad (2)$$

In formula (1), m represents the mass of the water on permeation side, unit: Kg; A represents the available membrane area, unit: $m^2$; t represents the penetration time, unit: h. In formula (2), $Y_1$ represents the content of the water on permeation side; $Y_2$ represents the content of the organics on permeation side; $X_1$ represents the content of the water on raw material side and $X_2$ represents the content of the organics on raw material side.

The pervaporation property of the multi-channel NaA zeolite membrane is measured through pervaporation ethanol dehydration separation experiments. The feed liquid is stirred constantly under the effect of magnetic stirring apparatus for even temperature and density of the feed liquid. The single multi-channel hollow fiber is placed in the feed liquid tank, with one end sealed and the other end connected to the vacuum system. The pressure of the vacuum system is kept lower than 200 Pa and the permeation product is trapped by liquid nitrogen condensation. The pervaporation results of the multi-channel hollow fiber NaA zeolite membrane in Embodiments 1, 2 and 3 with regard to 90 wt. % ethanol/water system separation at 75° C. are listed in Table 1. The breakage loads of the supports in the aforesaid embodiments are more than 17N, the separation factors of the prepared NaA zeolite membrane are more than 10000 and meanwhile the permeation water fluxes are more than $8.0 \text{ kg} \cdot m^{-2} \cdot h^{-1}$. The results indicate that the NaA zeolite membrane of excellent property can be prepared with the four-channel hollow fiber supports with different property parameters.

TABLE 1

Measurement Results of the Pervaporation Property in Each Embodiment

| Embodiments | Breakage load/N | Pervaporation property under the condition of 90 wt. % ethanol/water, 75° C. | |
| --- | --- | --- | --- |
| | | Water flux/kg · $m^{-2}$ · $h^{-1}$ | Separation factor |
| 1 | 17 | 12.8 | >10000 |
| 2 | 19 | 9.9 | >10000 |
| 3 | 21 | 8.0 | >10000 |

Note: breakage load means the force loaded when the hollow fiber with a span length of 4 cm breaks in the three-point bending strength test.

Embodiment 4

The property of the four-channel hollow fiber support, the preparation of crystal seed solution and the crystal seed coating are the same as that in Embodiment 3; a synthetic fluid of NaA zeolite membrane is prepared according to the mole ratio as $Al_2O_3:SiO_2:Na_2O:H_2O=1:4.5:48:950$; the synthesis of the NaA zeolite membrane is the same as that in Embodiment 1.

Embodiment 5

Seven-channel YSZ hollow fiber is selected, of which porosity factor is 65%, average pore diameter 1.4 µm, outer diameter 3.8 mm and channel diameter 1.0 mm. The breakage load of the four-channel hollow fiber with a length of 4 cm is 22 N in the three-point bending strength test.

Firstly, T-type zeolite crystal seed particles with an average particle diameter of 2 µm are fully dispersed in water to prepare a crystal seed suspension liquid with a mass fraction of 5%; then a dispersed crystal seed solution is obtained after full stirring. The dried support is immersed in the crystal seed solution to obtain a crystal-seeded seven-channel hollow fiber support after extracting and drying. A synthetic fluid of T-type zeolite membrane is prepared according to the mole ratio as $SiO_2:Al_2O_3:Na_2O:K_2O:H_2O=1:0.02:0.4:0.2:25$; the outer surface crystal-seeded multi-channel hollow fiber support is added into the prepared synthetic fluid and washed with deionized water to PH=7 after crystallizing and cooling, and finally dried to obtain T-type zeolite membrane. For its SEM photograph, please refer to FIGS. 3(a) and 3(b).

Embodiment 6

The property of the seven-channel hollow fiber support, the preparation of crystal seed solution and the crystal seed coating are the same as that in Embodiment 5; a synthetic fluid of the T-type zeolite membrane is prepared according to the mole ratio as $SiO_2:Al_2O_3:Na_2O:K_2O:H_2O=1:0.05:$ 0.2:0.04:13; the synthesis of the T-type zeolite membrane is the same as that in Embodiment 5.

Embodiment 7

Three-channel $TiO_2$ hollow fiber is selected, of which porosity factor is 30%, average pore diameter 0.6 μm, outer diameter 2.4 mm and channel diameter 0.6 mm. The breakage load of the four-channel hollow fiber with a length of 4 cm in the three-point bending strength test of 4 cm is 26N.

Figure 4:
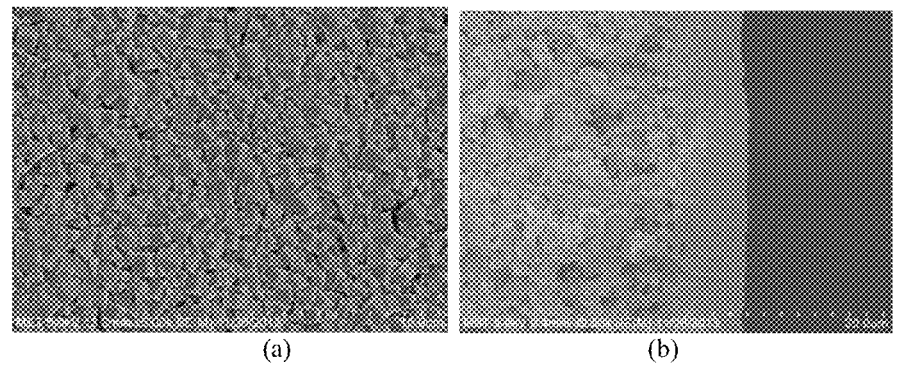
FIG. 4 is (a) surface microtopography and (b) fracture surface microtopography of three-channel hollow fiber MFI zeolite membrane in Embodiment 7.

Firstly, MFI-type zeolite crystal seed particles with an average particle diameter of 50 nm are fully dispersed in water to prepare a crystal seed suspension liquid with a mass fraction of 1%; then a dispersed crystal seed solution is obtained after full stirring. The dried support is immersed in the crystal seed solution to obtain a crystal-seeded four-channel hollow fiber support after extracting and drying. A synthetic fluid of T-type zeolite membrane is prepared according to the tetrapropyl ammonium hydroxide:tetraethyl orthosilicate: 1:3.2:560 (mole ratio); the outer surface crystal-seeded multi-channel hollow fiber support is added into the prepared synthetic fluid, and washed with deionized water to PH=9 after crystallizing and cooling, and finally dried to obtain MFI membrane. For its SEM photograph, please refer to FIGS. 4(a) and 4(b).

Embodiment 8

The property of the three-channel $TiO_2$ hollow fiber support, the preparation of crystal seed solution and the crystal seed coating are the same as that in Embodiment 7; a synthetic fluid of MFI zeolite membrane is prepared according to the tetrapropyl ammonium hydroxide:tetraethyl orthosilicate: 1:5.2:1200 (mole ratio); the synthesis of the MFI zeolite membrane is the same as that in Embodiment 7.

Comparative Example 1

The literature Journal of the American Chemical Society (2009, 131(20): 6910-6911) reported that the research group of Professor Wang Zhengbao of Zhejiang University adopts the combined method as dip coating-wipe coating of crystal seed coating to prepare NaA zeolite membrane on the single-channel aluminum oxide hollow fiber with a porosity factor of 50%; when separating 90 wt. % ethanol/water mixture at 75° C., the flux is 9.0 kg·m$^{-2}$·h$^{-1}$. In Embodiment 1 of the Invention, the permeation water flux of the NaA zeolite membrane prepared on the four-channel aluminum oxide hollow fiber with a porosity factor of 54% is up to 12.8 kg·m$^{-2}$·h$^{-1}$. It is thus clear that the permeation property of the NaA zeolite membrane prepared on the four-channel hollow fiber support is higher than that of the single-channel hollow fiber support.

Comparative Example 2

Figure 5:
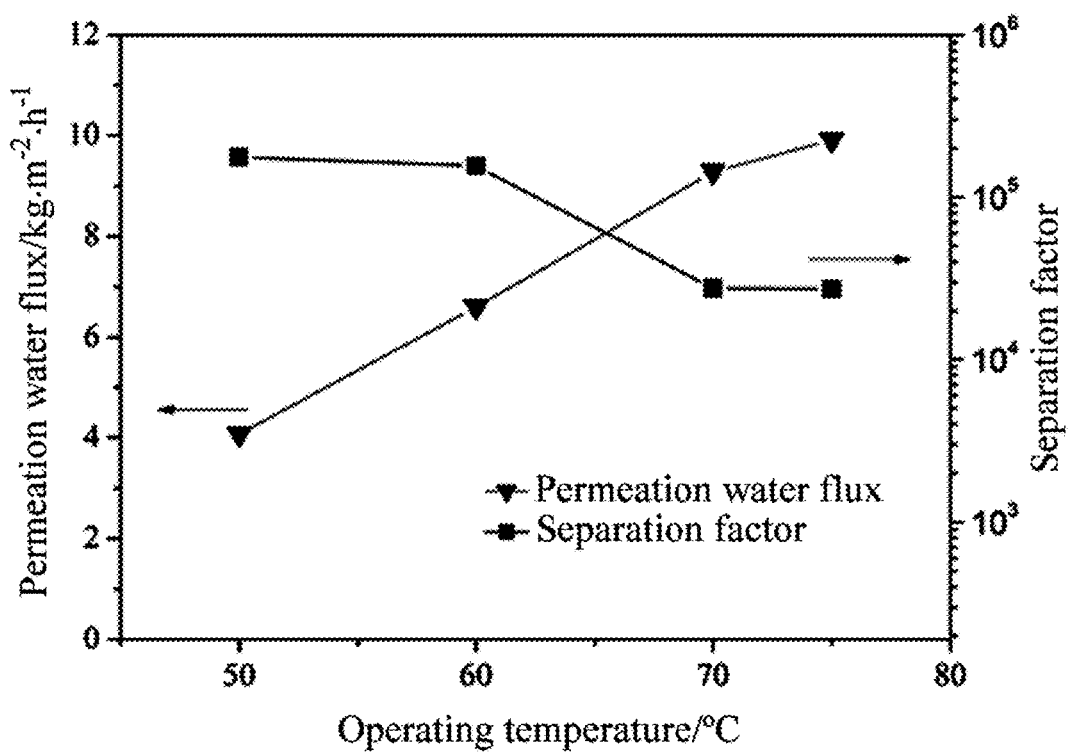
FIG. 5 is the effect of operating temperature on the pervaporation property of the four-channel hollow fiber NaA zeolite membrane in Embodiment 2.

Patent CN200910193335.9 reported the method for synthesizing the NaA zeolite membrane on α-$Al_2O_3$ hollow fiber surface invented by Yuan Wenhui et al. However, when separating 90 wt. % ethanol/water at 60° C., the permeation flux of the single-channel aluminum oxide hollow fiber NaA zeolite membrane prepared by them is only 1.950.35 kg·m$^{-2}$·h$^{-1}$, while the permeation water of the four-channel aluminum oxide hollow fiber NaA zeolite membrane in Embodiment 2 of the Invention tested under the same condition is 6.2 kg·m$^{-2}$·h$^{-1}$ (refer to FIG. 5), which is 2-3 times of the former.

Comparative Example 3

The literature Membrane Science and Technology (2011, 31(2):19-22) reported the NaA zeolite membrane prepared on the optimized single-channel aluminum oxide hollow fiber by us; the flux of which is up to 7.37 kg·m$^{-2}$·h$^{-1}$; the bending strength of the selected support is 142.7 Mpa and the breakage load of the four-channel hollow fiber with a span length of 4 cm is 6N in the three-point bending strength test. The breakage load of the four-channel aluminum oxide hollow fiber with a span length of 4 cm selected in Embodiment 3 of the Invention is 18N, which is 3 times of the former.

What is claimed is:

1. A method for preparing a high-strength hollow fiber zeolite membrane, the method comprising the following steps:
   (1) preparing a crystal seed solution: preparing a zeolite suspension liquid from zeolite crystal seed particles and water, wherein the mass fraction of the zeolite crystal seed particles in the zeolite suspension liquid is 0.5-5%, then adding sodium silicate in the zeolite suspension liquid and stirring to obtain a crystal seed solution;
   (2) crystal seed coating: obtaining a support having a multi-channel hollow fiber configuration, immersing said support in the crystal seed solution, extracting the support from the crystal seed solution, and drying the support to obtain a crystal-seeded support; and
   (3) synthesis of the high-strength hollow fiber zeolite membrane: placing the crystal-seeded support in a zeolite membrane synthetic fluid, performing hydrothermal synthesis on the crystal-seeded support to form a product, taking the product out of the zeolite membrane synthetic fluid, washing the product to pH=7-9, and drying the product to obtain the high-strength hollow fiber zeolite membrane.

2. A method according to claim 1, characterized in that the average particle diameter of the zeolite crystal seed particles is 50 nm-3 μm; and the amount of the sodium silicate added in the zeolite suspension liquid is 0-25% of the mass fraction of the zeolite suspension liquid.

3. A method according to claim 1, characterized in that the multi-channel hollow fiber configuration in step (2) has 3-9 channels; an external diameter of the support is 2.0-4.0 mm, the diameter of each channel in the support is 0.6-1.2 mm, the support has an average pore diameter of 0.6-1.5 μm, and the support has a porosity factor of 30-70%.

4. A method according to claim 1, characterized in that the material of the support of the high-strength zeolite membrane is one or more of aluminum oxide, titanium oxide, yttria-stabilized zirconia, or silicon oxide.

5. A method according to claim 1, characterized in that the zeolite crystal seed particles are one of the zeolites of NaA, T-type, MFI-type, or CHA-type.

* * * * *